(12) United States Patent
Hirasawa

(10) Patent No.: US 10,921,953 B2
(45) Date of Patent: Feb. 16, 2021

(54) DISPLAY CONTROLLING DEVICE, DISPLAY CONTROLLING METHOD, AND NON-TRANSITORY COMPUTER-READABLE RECORDING MEDIUM STORING INSTRUCTIONS THEREFOR

(71) Applicant: BROTHER KOGYO KABUSHIKI KAISHA, Aichi (JP)

(72) Inventor: Yoshi Hirasawa, Anjo (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 99 days.

(21) Appl. No.: 15/935,129

(22) Filed: Mar. 26, 2018

(65) Prior Publication Data
US 2019/0004679 A1   Jan. 3, 2019

(30) Foreign Application Priority Data

Jun. 30, 2017   (JP) ................. 2017-128309

(51) Int. Cl.
| | | |
|---|---|---|
| G06F 3/048 | (2013.01) | |
| G06F 3/0481 | (2013.01) | |
| G06F 3/0483 | (2013.01) | |
| H04N 1/00 | (2006.01) | |

(52) U.S. Cl.
CPC ........ *G06F 3/04817* (2013.01); *G06F 3/0483* (2013.01); *H04N 1/00424* (2013.01); *H04N 1/00517* (2013.01)

(58) Field of Classification Search
CPC ... G06F 3/0482; G06F 3/04817; G06F 3/0483
USPC .......... 715/811, 200, 745, 777, 763
See application file for complete search history.

(56) References Cited

U.S. PATENT DOCUMENTS 6,029,198 A * 2/2000 Iizuka ................ G06F 3/04847
709/223
2010/0287490 A1   11/2010 Ichimi

FOREIGN PATENT DOCUMENTS

| JP | 2010-262501 A | 11/2010 |
|---|---|---|
| JP | 2016-157232 A | 9/2016 |

OTHER PUBLICATIONS

Bostrom Paula, How to Customize Your Home Screen in iTunes, Published Jan. 30, 2016, iphonelife.com, pp. 1-9 (pdf).*
(Continued)

*Primary Examiner* — Manglesh M Patel
(74) *Attorney, Agent, or Firm* — Scully, Scott, Murphy & Presser, PC

(57) ABSTRACT

A controller of a display control device is configured to display a plurality of tabs, and a tab screen associated with a selected one of the tabs. In response to a particular arranging operation to arrange a particular icon in one of a common area and an individual area of a tab screen associated with the selected tab, one of the common area and the individual area is set as an arrangement target area and the particular icon assigned with a particular process in accordance with the arranging operation is arranged in the arrangement target area. The particular icon is arranged only in the individual area of the tab screen currently displayed when the arrangement target area is the individual area, while the particular icon is arranged in the common area of each of the plurality of tab screens when the arrangement target area is the common area.

9 Claims, 10 Drawing Sheets

(56) References Cited

OTHER PUBLICATIONS

Rene Ritchie, Lock Screen: The Ultimate Guide, published Nov. 13, 2016 via imore.com, pp. 1-34(pdf).*

* cited by examiner

DISPLAY CONTROLLING DEVICE, DISPLAY CONTROLLING METHOD, AND NON-TRANSITORY COMPUTER-READABLE RECORDING MEDIUM STORING INSTRUCTIONS THEREFOR

CROSS-REFERENCE TO RELATED APPLICATIONS

This application claims priority under 35 U.S.C. § 119 from Japanese Patent Application No. 2017-128309 filed on Jun. 30, 2017. The entire subject matter of the application is incorporated herein by reference.

BACKGROUND

Technical Field

The present disclosures relate to a technique to control a screen displayed on a display of a display controlling device.

Related Art

There is known a conventional process execution device configured to display a so-called tabbed-multiscreen form standby screen on a touch panel have been known. Such a tabbed-multiscreen form screen has multiple tabs, and by switching the tabs, contents of the screen are switched.

SUMMARY

In the conventional process execution device mentioned above, a plurality of buttons to which particular processes are respectively assigned are arranged in each tab. A user can assign a particular process to anyone of the plurality of buttons. Thereafter, when the user wishes to execute one of processes assigned to the plurality of tabs, the user selects a tab corresponding to the tabbed-screen on which the button assigned with the process to be executed, and operates the button, thereby the process assigned to the button can be executed.

A device employing the tabbed-multiscreen form standby screen as mentioned above could be used as follows. An administrator may assign the tabs to individual persons or groups, and on screens corresponding to respective tabs, buttons assigned with particular processes are arranged.

There could be a case where a particular process is to be assigned not only to an individual person or a group, but to a plurality of persons or groups. In such a case, for example, the administrator may assign the process to each of the plurality of tabs. Then, the users corresponding to the respective tabs can execute such a process. However, such a configuration requires the administrator for a troublesome assigning operation.

In contrast, according to another usage type, the particular process may be assigned to a button arranged on a screen corresponding to a particular tab. According to such a configuration, when a user wishes to execute the particular process, the user may select the particular tab whenever the process is to be executed. According to such a configuration, however, the user is required to switch to the particular tab whenever the particular process is to be executed. Thus, such a configuration is inconvenient for the user.

In consideration of the above, the present disclosures provide an improved display controlling device, an improved display controlling method, and a non-transitory computer-readable recording medium storing instruction therefor, which enable the user to select and execute the particular process efficiently.

According to aspects of the present disclosures, there is provided a display control device having a display, an input device and a controller. The controller is configured to cause the display control device to display a plurality of tabs, and a tab screen corresponding to one of the plurality of tabs in a selected state from among a plurality of tab screens respectively corresponding to the plurality of tabs. Each of the plurality of tab screens has a common area and an individual area, icons being displayed in each of the common area and the individual area. The common area and the individual area are configured such that a particular icon assigned with a particular process being arranged in each of the common area and the individual area. The controller is further configured to receive, through the input device, a particular arranging operation to arrange the particular icon in one of the common area and the individual area of the tab screen currently displayed on the display, and set one of the common area and the individual area designated by the arranging operation as an arrangement target area and arrange the particular icon assigned with the particular process determined in accordance with the arranging operation in the arrangement target area, the controller arranging the particular icon only in the individual area of the tab screen currently displayed on the display when the arrangement target area is the individual area, the controller arranging the same particular icon in the common area of each of the plurality of tab screens when the arrangement target area is the common area.

According to aspects of the present disclosures, there is provided a display control method for a display control device having a display and an input device, the method includes causing the display control device to display a plurality of tabs, and a tab screen corresponding to one of the plurality of tabs in a selected state from among a plurality of tab screens respectively corresponding to the plurality of tabs. Each of the plurality of tab screens has a common area and an individual area, icons being displayed in each of the common area and the individual area. The common area and the individual area are configured such that a particular icon assigned with a particular process being arranged in each of the common area and the individual area. The method further includes receiving, through the input device, a particular arranging operation to arrange the particular icon in one of the common area and the individual area of the tab screen currently displayed on the display, and setting one of the common area and the individual area designated by the arranging operation as an arrangement target area and arranging the particular icon assigned with the particular process determined in accordance with the arranging operation in the arrangement target area, the method arranging the particular icon only in the individual area of the tab screen currently displayed on the display when the arrangement target area is the individual area, and the method arranging the same particular icon in the common area of each of the plurality of tab screens when the arrangement target area is the common area.

According to aspects of the present disclosures, there is provided a non-transitory computer-readable medium containing instructions to be executed by a controller of a display control device having a display, an input device and the controller. The instructions cause, when executed by the controller, the display control device to display a plurality of tabs, and a tab screen corresponding to one of the plurality of tabs in a selected state from among a plurality of tab screens respectively corresponding to the plurality of tabs, each of the plurality of tab screens having a common area and an individual area, icons being displayed in each of the common area and the individual area. The common area and the individual area being configured such that a particular icon assigned with a particular process being arranged in each of the common area and the individual area. The instructions further cause, when executed by the controller, the display control device to receive, through the input device, a particular arranging operation to arrange the particular icon in one of the common area and the individual area of the tab screen currently displayed on the display, and set one of the common area and the individual area designated by the arranging operation as an arrangement target area and arranging the particular icon assigned with the particular process determined in accordance with the arranging operation in the arrangement target area, the controller arranging the particular icon only in the individual area of the tab screen currently displayed on the display when the arrangement target area is the individual area, and the controller arranging the same particular icon in the common area of each of the plurality of tab screens when the arrangement target area is the common area.

BRIEF DESCRIPTION OF THE ACCOMPANYING DRAWINGS

DETAILED DESCRIPTION OF THE EMBODIMENTS

Hereinafter, referring to the accompanying drawings, illustrative embodiments of the present disclosures will be described.

1. Illustrative Embodiment (1-1) Configuration of Image Processing Device

Figure 1:
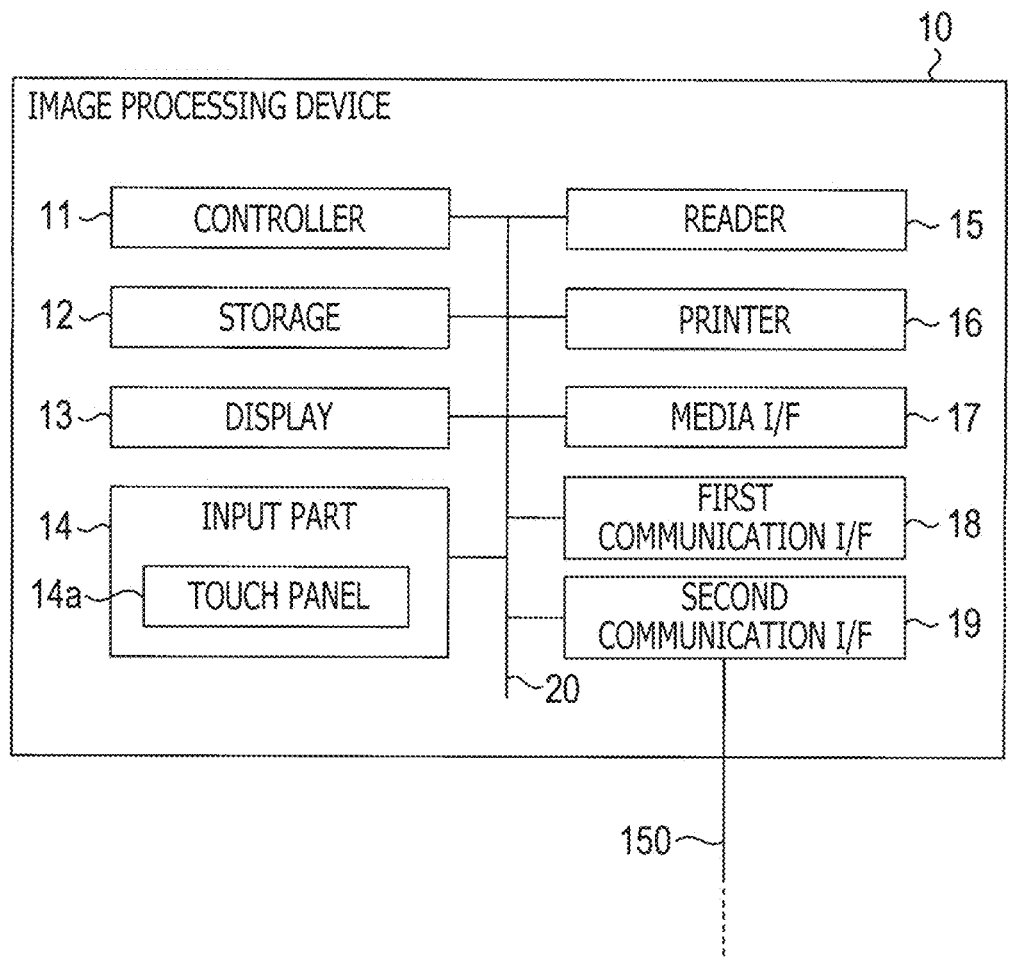
FIG. 1 is a block diagram showing a functional configuration of an image processing device according to an illustrative embodiment of the disclosures.

An image processing device 10 according to an illustrative embodiment shown in FIG. 1 has multiple functions including a scanning function to read an image on an original and generate image data representing the read image, a print function to print an image on a printing sheet, a copying function to print an image read by the scanning function onto the printing sheet by the print function, and a facsimile function to transmit/receive facsimile data.

The image processing device 10 has, as shown in FIG. 1, a controller 11, a storage 12, a display 13, an input part 14, an image reader 15, a printer 16, a media I/F 17, a first communication I/F 18 and a second communication I/F 19, which are interconnected via a bus 20.

The controller 11 has a CPU. The storage 12 includes semiconductor memories such as a ROM, a RAM, an NVRAM, a flash memory and the like. It could be said that the image processing device 10 is provide with a microcomputer including the CPU and semiconductor memories.

The controller 11 realizes various functions by executing programs stored in a non-transitory recording medium. According to the illustrative embodiment, the storage 12 is an example of the non-transitory recording medium storing the programs, or computer executable instructions. It is noted that the various functions, which are realized by the controller 11 according to the illustrative embodiment, are not necessarily be realized by execution of the programs. A part of or all of the functions may be realized with used of a plurality of hardware.

The storage 12 stores data of various screens, including the standby screen 25 (see FIG. 2), to be displayed on the display 13. Further, the storage 12 also stores the programs for a main control process (see FIGS. 5-7) and an arranged area changing process (see FIGS. 9A and 9B). The programs realizing the respective functions described above may be included in the program of the main control process, or provided as separate programs.

The display 13 has a device configured to display an image such as a liquid crystal display or an organic EL display. The input part 14 has an input device through which various input operations of a user are acquired. The input device which the input part 14 has includes a power button 5 (see FIG. 2), a numeric keypad 6, a return button 7, a home button 8, a stop button 9 and a touch panel 14a. The touch panel 14a is arranged on an image display area of the display device of the display 13.

The touch panel 14a is configured to detect a designating operation by contact or proximity of a designation body onto an image display area of the display 13. The touch panel 14a is configured such that, when an instruction operation using the designating body is performed on the image display area of the display 13, the touch panel 14a outputs position information indicating a position at which the designating body is located. According to the illustrative embodiment, that touch panel 14a continuously or periodically outputs the position information when the designating operation with use of the designating body is being performed. It is noted that the touch panel 14a may be configured to detect, as the designating operation, only a contact of the designating body, only proximity of the designation body, or both the contact and proximity of the designating body.

The controller 11 obtains the position information output by the touch panel 14a, and based on the obtained position information, presence/absence of the designating operation of the designating body, the designated position when the designating operation is performed, and at least one particular operation by the designating body when the designating operation is performed.

The operations the controller 11 can detect include at least a tap operation which is an operation of releasing the designating body at the same position where the designating operation with use of the designating body is performed. Various concrete aspects of the designating body used to perform the designating operations can be considered. For example, the designating body may be a tip of a finger, or a particular designating device such as a stylus pen.

The image reader 15 has an image sensor, and configured to read an image on the original and generates image data representing the read image. Optionally, the image reader is provided with an ADF (automatic document feeder). Further optionally, the image reader 15 may be configured to execute a double-sided scanning to read images on both sides of the original set to the platen or the ADF.

The printer 16 has a printing mechanism for printing an image on a printing sheet in accordance with an inkjet printing method or an electrophotographic printing method. Optionally, the printer 16 may be configured to perform a double-sided printing to print images on both sides of the printing sheet.

The media I/F 17 is an interface to which various recoding media such as a USB flash memory are coupled. The media I/F 17 controls reading and writing of data with respect to the recording medium coupled thereto.

The first communication I/F 18 is a communication interface functioning to connect the image processing device 10 to a network for data communication. The first communication I/F 18 may be configured to be connectable with at least one of various types of networks such as a wired LAN, a wireless LAN or the Internet. Optionally, the image processing device 10 may be configured to execute a data communication with various information processing devices such as a personal computer, a smartphone, a tablet terminal and the like through the first communication I/F 18, with or without wires. Further optionally, the image processing device 10 may be configured to be connected to the Internet through the first communication I/F 18 and may execute the data communication with various servers and/or information processing devices through the Internet.

The second communication I/F 19 is an interface for communicating with external equipment through a communication line 100. The communication line 100 connected to the second communication I/F 19 is, according to the illustrative embodiment, for example, a public telephone network. Transmission/reception of facsimile data by the facsimile function is executed basically through the second communication I/F 19.

(1-2) Configuration of Operation Panel

Figure 2:
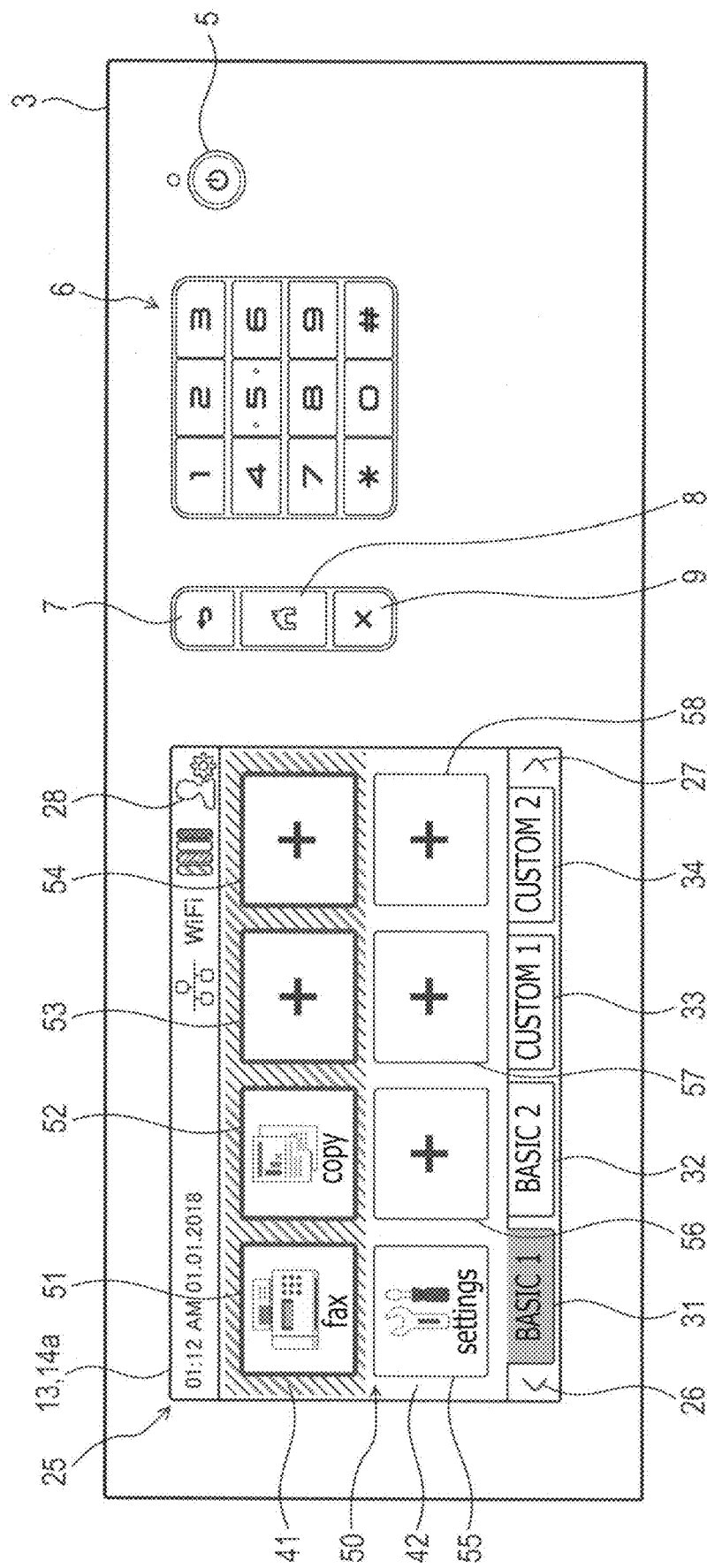
FIG. 2 shows an operation panel of the image processing device according to the illustrative embodiment of the disclosures.

On one side surface of a housing (not shown) of the image processing device 10, an operation panel 3 is proved as shown in FIG. 2. On the operation panel 3, a power button 5, a numeric keypad 6, a return button 7, a home button 8, a stop button 9, a display 13 and a touch panel 14a. It is noted that the display 13 shown in FIG. 2 is configured such that a displaying device provided to the display 13 has an image display area. The touch panel 14a is arranged to overlaid on almost entire range of the image display area.

The power button 5 is a hard key operated by the user to turn ON/OFF the power of the image processing device 10. When the power button 5 is depressed, the power is supplied to the image processing device 10 and the image processing device 10 start operating, the controller 11 executes a particular initialization process, and then displays a standby screen 25 on the display 13. By performing input operations with the standby screen 25 as a starting point, the user can switch the screens displayed on the display 13, make various settings, and cause the image processing device 10 to execute various functions.

The numeric keypad 6 is a collective name of multiple hard keys including number keys of "0"-"9" which are operated by the user mainly when numbers are input when, for example, a destination facsimile number of facsimile data is input or the number of copies is input when the copying function is used.

The return button 7 is a hard key which is operated by the user when the user wishes to return the screen currently displayed on the display 13 to a screen immediately before switched to the current screen. The home button 18 is a hard key to be operated by the user when the user wishes to display the standby screen 25 on the display 13. The stop button 9 is a hard key operated by the user when the user wants to stop the currently executed operation.

(1-3) Description on Standby Screen

The standby screen 25 is a so-called tabbed-multiscreen form standby screen which includes a plurality of tabs. The tabs are associated with tab screens, respectively. On the standby screen 25, a tab screen corresponding to one tab which is currently in a selected state is displayed. Information necessary to display the standby screen 25, and information regarding processes to be executed when input operations with respect to the standby screen are performed through the input part 14 are stored in the storage 12.

As shown in FIG. 2, utmost four tabs can be displayed on the standby screen 25. It is noted that, according to the illustrative embodiment, the total number Nt of the tabs is greater than four which is the number of the tabs that can be displayed on the standby screen 25 simultaneously. FIG. 2 shows a state where a first tab 31, a second tab 32, a third tab 33 and a fourth tab 34 are displayed, among the first to Nt-th tabs, on the standby screen 25.

On each tab, a name assigned to the tab is indicated. Further, a tab being in a selected state is displayed in a mode different from the other tabs. For example, the selected tab and the other tabs are displayed such that the selected tab has a color different from the color of the other tabs, the selected tab is larger than the other tabs, or only the selected tab may be decorated. FIG. 2 shows an example in which the first tab 31 of which name is "BASIC 1" (representing a basic function 1) is selected, and has a color different from the color of the other tabs (i.e., the second, third and fourth tabs 32, 33 and 34).

The first to Nt-th tabs are respectively associated with tab screens (i.e., first to Nt-th tab screens). On the standby screen 25, a tab screen corresponding to the tab in the selected state is displayed. In the example shown in FIG. 2, the first tab 31 is in the selected state, and a first tab screen 50 associated with the first tab 31 is displayed.

Each tab screen is configured such that a plurality of icons are arranged thereon. According to the example shown in FIG. 2, eight icons (first to eighth icons 51-58) are arranged on the tab screen 50. Each icon displayed on the tab screen 50 can be changed as will be described later.

According to the example shown in FIG. 2, the first icon 51 is a fax icon, the second icon 52 is a copy icon, the fifth icon 55 is a setting menu icon, and the third icon 53, the fourth icon 54 and the sixth icon 56 are unregistered icons to which no functions are assigned.

In the vicinities of both ends of the tab display area, in the standby screen 25, a right button 27 and a left button 26 are displayed. It is noted that an arranging order in the right-left direction of Nt tabs is determined in advance. When there exists another tab on the left side of the currently displayed four tabs, by tapping the left button 26, the currently displayed four tabs are scrolled rightward, thereby the tab on the left side with respect to the 1st tab 31 will be displayed in the tab display area 30. In contrast, the rightmost tab (i.e., the 4th tab 34) of the currently displayed four tabs will disappear as they are scrolled rightward. Similarly, when there exists a tab on the right side with respect to the currently displayed four tabs, by tapping the right button 27 to scroll the currently displayed four tabs leftward, the tab arranged on the right side with respect to the 4th tab 34 will be displayed within the tab display area 30, while the leftmost tab 31 will disappear when the four tabs are scrolled leftward.

When the tab screen corresponding to the currently selected tab is switched to another tab screen corresponding to anther tab, another should be tapped. When one of the tabs other than the currently selected tab is tapped, the tapped tab is in the selected state, and on the standby screen 25, the tab screen corresponding to the tab newly set to the selected state is displayed.

It is assumed, for example, that the first tab screen corresponding to the first tab 31 is displayed on the standby screen 25 as shown in FIG. 3A. In such a state, in response to the second tab 32 on which "BASIC 2" is displayed being tapped, the tab in the selected state is switched from the first tab 31 to the second tab 32 as shown in FIG. 3B, and thereafter, a second tab screen 60 associated with the second tab 32 is displayed instead of the first tab screen 50.

On the second tab screen 60, eight icons (i.e., first icon 61 through eighth icon 68) are displayed. On the second tab screen 60, the first icon 61 is the fax icon whish the same icon as the first icon 51 on the first tab screen 50, and a second icon 62 is a copy icon which is the same icon as the second icon 52 on the first tab screen 50. The third icon 63 through the eighth icon 68 are unregistered icons.

To each icon arranged on each tab screen, a particular process is assigned. When the user taps one of the icons, the particular process assigned to the tapped icon is executed.

The icons displayed in the tab screen of the standby screen 25 includes, when generally categorized, three kinds of icons. Specifically, the three kinds of icons are function execution icons, setting icons, and unregistered icons. The function execution icons are icons to which functions, among the multiple functions the image processing device 10 has, to be executed are assigned, respectively. That is, to the function execution icons, particular processes to respectively realize registered functions are assigned. When one of the function execution icons is tapped, the particular process assigned to the tapped icon is executed, thereby the registered function being realized.

The setting icons are icons to which a particular item subjected to be set, or lists of multiple icons subjected to be set are assigned. That is, to the setting icons, particular processes to respectively realize setting items are assigned. When one of the setting icons is tapped, the particular process assigned to the tapped icon is executed, thereby the setting of setting item being realized.

The unregistered icons are icons to which no functions or setting items are assigned, and user's desired functions or setting items can be newly and arbitrarily assigned thereto. To each of the unregistered icons, a particular process associated with a user input operation to newly register the function execution icon for an arbitrary function, or newly register the setting icon for an arbitrary setting item is assigned. Thus, when the unregistered icon is tapped, the particular process assigned to the unregistered icon is executed, thereby registration of the new function execution icon or the setting icon being realized.

The function execution icons are further categorized in tow kinds of icons: specific function icons; and shortcut icons. The specific function icons are icons for executing functions the image processing device 10 has (i.e., the scanning function, the print function, the copying function, the facsimile function, web service functions, convenient tool functions and the like), respectively, and the function subjected to be executed is assigned to each specific function icon. The specific function icons have been registered, in advance, as the factory default setting. Setting values assigned to the respective specific function icons are default values preliminarily set. It is noted that the user can confirm and/or change such a default value when the user taps the specific function icon to execute the assigned specific function.

To each of the shortcut icons, a shortcut to execute any of the specific functions in accordance with a particular execution condition the user set in advance can be assigned. At a time of shipment of the image processing device 10, at least one icon may be preliminarily arranged on each tab screen, the at least one icon being at least one of the specific function icon or the setting icon.

The shortcut icons are, basically, not preliminarily registered as the factory default setting of the image processing device 10. The shortcut icon is arranged when the user executes a registration operation to assign a shortcut with respect to an unregistered icon. It is noted that at least one shortcut icon may be arranged on at least one tab screen when the image processing device 10 is arranged in advance.

It is noted that, regarding the specific function icons, the initial values for respective setting items have been preliminarily determined. In contrast, regarding the shortcut icons, the user can register the function subjected to be executed, with setting conditions to execute the functions, arbitrarily.

It is noted that, the unregistered icons can be registered as a shortcut icon by assigning an arbitrary shortcut function thereto. Further, the unregistered icons can be registered as the specific function icons by assigning desired functions and/or registered as the setting icons by assigning desired setting items.

In the first tab screen 50 shown in FIG. 2 and the FIG. 3A, the fax icon arranged as the first icon 51 is the specific function icon to execute the facsimile function. The copy icon arranged as the second icon 52 is the specific function icon to execute the copying function. the setting menu icon arranged as the fifth icon 55 is the setting icon to set the setting value of at least one kind of setting item.

Figure 4:
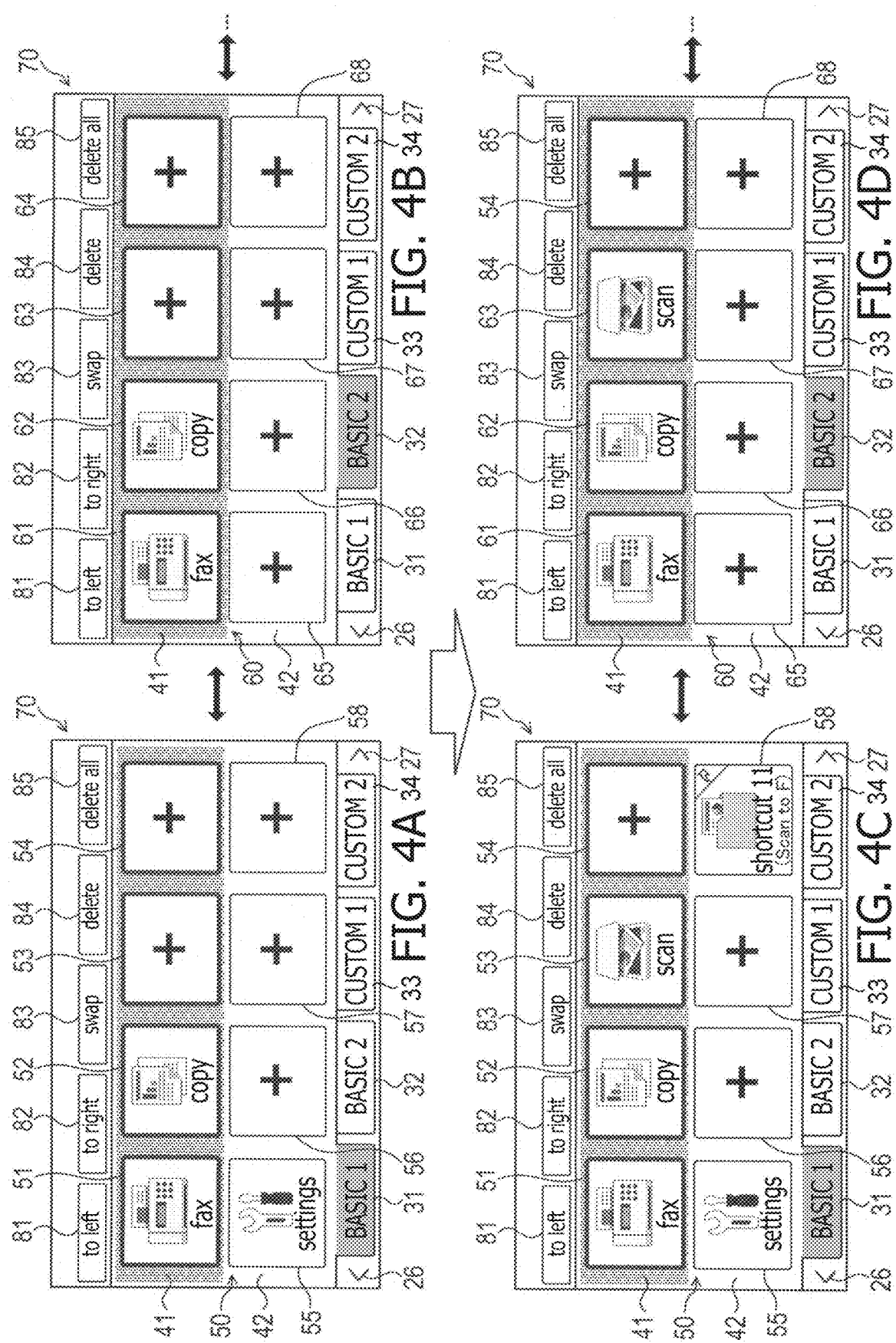
FIGS. 4A-4D illustrate a standby editing screen according to the illustrative embodiment.

Further, the scan icons arranged as third icons 53 and 63 in the first tab screen 50 and the second tab screen 60 shown in FIGS. 4C and 4D are the specific function icons to execute the scanning function. It is noted that the two scan icons are the same icons and assigned with the same particular process.

In the first tab screen 50 shown in FIG. 4C, the icon arranged as the eighth icon 58 is a shortcut icon to which a shortcut function of scan-to-file is assigned. The scan-to-file function is one of concrete modes of the scanning function.

Regarding the shortcut function, as described above, the user can arbitrarily assign the shortcut function to the unregistered icon. Examples of the functions which can be assigned to the unregistered icons as the shortcut function include, for example, the above-described specific function, namely, the facsimile function, the copying function, the scanning function, the web service function and a convenient tool function.

For example, when the user wishes to assign the shortcut function of the copying function, firstly the user taps the unregistered icon included in the tab screen associated to anyone of the tabs. When the user taps the unregistered icon, a list of functions and setting items which can be assigned to the unregistered icon is displayed. Then, the user can select, from the list, the function or the setting item to be assigned to the unregistered icon.

When anyone of the setting items is selected, a setting icon corresponding to the selected setting item is newly registered. That is, the unregistered icon subject to the registration is changed to the setting icon assigned with the particular process in accordance with the selected setting item. Thereafter, when the user taps the setting icon, the particular process assigned to the setting icon is executed. Then, the user can check and/or change the setting values of the setting items assigned to the setting icon.

After the unregistered icon is tapped and one of the functions is selected from the list, a selection screen allowing the user to select whether the function is registered as the specific function icon or the shortcut icon is displayed.

When registration as the specific function icon is selected, the specific function icon corresponding to the selected function is newly registered. That is, the unregistered icon subject to the registration is registered as the specific function icon assigned with the particular process in accordance with the selected function.

According to the present embodiment, it is possible to arrange a plurality of icons assigned with the same particular process in one tab screen or in a plurality of tab screens. When there is a specific function icon or a setting icon which is arranged at the time of the shipment, the user can arrange the icon same as the icon arranged at the shipment in addition to the same.

When registration of the shortcut function is selected, a setting screen encouraging the user to select on what execution condition the selected function is to be executed. The user can arbitrarily set the setting values of respective setting items necessary to cause the selected function to be executed (i.e., the execution condition) through the setting screen. When an operation of indicating completion of the setting, the shortcut icon executing the selected function in accordance with the particular execution condition is generated. That is, the unregistered icon subject to the registration is registered as the shortcut icon to which the particular process in accordance with the execution condition. Thereafter, when the user taps the shortcut icon, the particular process assigned to this shortcut icon is executed, and the registered function can be executed easily in accordance with the registered particular execution condition.

(1-4) Description of Management Function

As shown in FIGS. 2, 3A and 3B, on the standby screen 25, an administrator button 28 (hereinafter, also referred to as ADMIN button 28) is displayed. The ADMIN button 28 is tapped, an authentication screen for the administrator is displayed. When the user (i.e., the administrator) inputs necessary information (e.g., a password), an authentication process is executed.

The authentication process is to determine whether particular authentication conditions have been fulfilled. The authentication conditions include a condition that an input password coincides with a legitimate password which has preliminarily been registered. As a result of the authentication process, if the authentication conditions are fulfilled, the operation mode is switched to the administrator mode, and a standby editing screen 70 as shown in FIG. 4A is displayed on the display 13. It is noted that the standby editing screen 70 is a screen on which new registration, release of registration, edition of registered contents with respect to each of the icons arranged on each tab screen can be performed.

On the standby editing screen 70, as shown in FIGS. 4A and 4B, a plurality of tabs and a tab screen corresponding to the tab in the selected state are displayed as in the standby screen 25. The plurality of tabs and the contents of the tab screen displayed on the standby editing screen 70 are basically the same as those of the standby screen 25. Further, a configuration that the contents of the tab screen can be changed by switching the selection state of the plurality of tabs is the same as that of the standby screen 25.

On the standby editing screen 70, as shown in FIGS. 4A and 4B, icon editing buttons for respective kinds of editing operations for executing editing operations targeting part of or all of the icons included in each tab screen as processed targets are displayed. Specifically, according to the present embodiment, as the icon editing buttons, a left movement button 81, a right movement button 82, a swapping button 83, a deletion button 84 a batch deletion button 85 are displayed.

The batch deletion button 85 is a button to release the registered states of all the icons arranged on the tab screens corresponding to all the tabs and to switch the states of all the icons to the unregistered state. The deletion button 84 is a button to release the registered states of the selected icons (except for the unregistered icons) and to switch the sates of the selected icons to the unregistered state. It is noted that, in the following description, an expression of "deleting" the arranged icons means "releasing" of the registered state of the icon and make the icon be in the unregistered state.

The swapping button 83 is to swap positions of two icons. The right movement button 82 is to shift an icon to a right side thereof. The left movement button 81 is to shift an icon to a left side thereof.

When the standby screen 25 is displayed after performing the operations as above (i.e., new registration, editing, deleting, moving and/or swapping of the icons) in the standby editing screen 70, the operations performed with respect to the standby editing screen 70 have been reflected on the standby screen 25.

(1-5) Description on Areas Defined in Tab Screens

Figure 3:
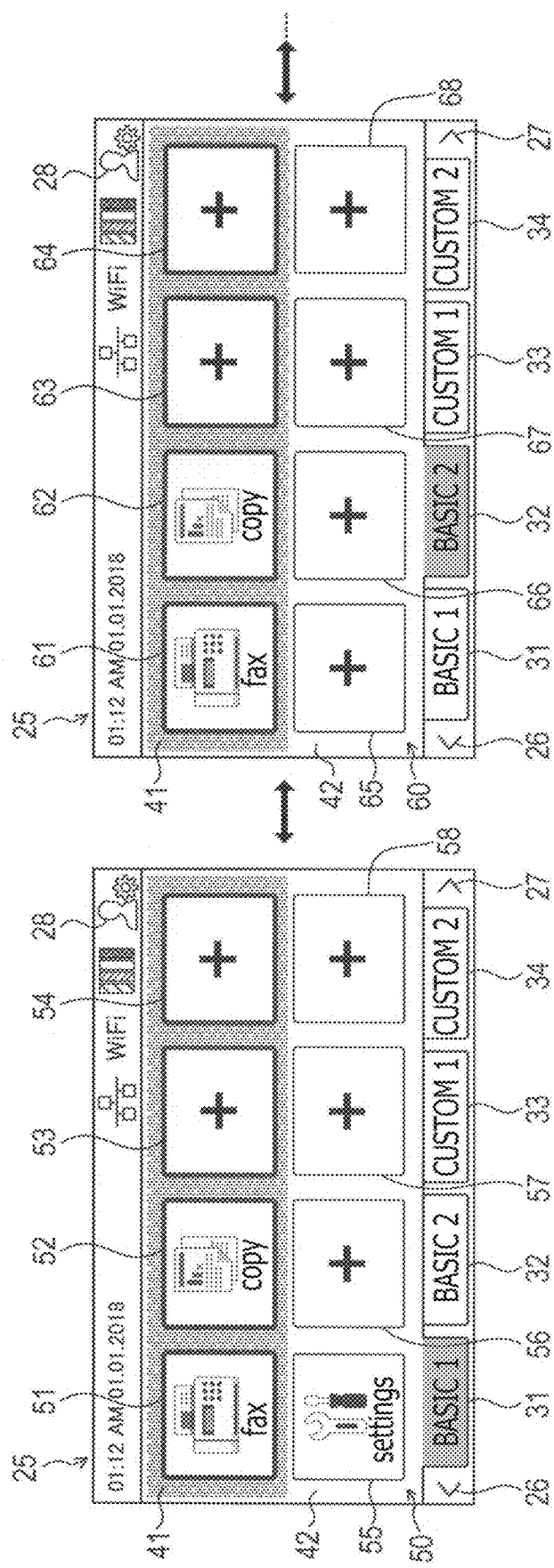
FIGS. 3A and 3B illustrate a standby screen according to the illustrative embodiment.

As shown in FIGS. 2 and 3, in each tab screen, a common area 41 and an individual area 42 are defined. Among eight icons arranged within the tab screen, first through fourth icons are arranged in the common area 41, and fifth through eighth icons are arranged in the individual area 42.

The four icons arranged in the common area 41 are the same in all the tab screens. That is, even if the selected tab is switched to another and the displayed tab screen is switched, the icons arranged in the common area 41 are unchanged.

According to the illustrative embodiment, in a state where one of the tab screens is displayed, if a function execution icon or a setting icon is newly arranged in the common area 41 of the displayed tab screen, the icon is arranged not only in the currently displayed tab screen, but the same icon is arranged in the common area 41 of each of the other tab screens.

Further, according to the illustrative embodiment, in a state where one of the tab screens is displayed, if any one of the icons arranged in the common area 41 of the displayed tab screen is deleted, the icon is removed from the currently displayed tab screen, and further, the same icon arranged at the same position in the common area 41 of each of the other tab screens is also deleted.

Further, according to the illustrative embodiment, in a state where one of the tab screens is displayed, if an editing operation is applied to anyone of the icons arranged in the common area 41 of the displayed tab screen, the registered content regarding the icon is updated in the currently displayed tab screen, and further, the registration content of the same icon arranged at the same position in the common area 41 of each of the other tab screens is also updated.

As above, the operations (i.e., registration, edition, movement, deletion and the like) applied to an icon arranged in the common area 41 of the tab screen currently displayed is reflected not only to the icon arranged in the common area 41 of the currently displayed tab screen, but to the icon arranged at the same position in the common area 41 of the other tab screen. Thus, the icons arranged in the common area 41 in one tab screen are the same as the icons arranged in the common area 41 of any other one of the tab screens.

For example, it is assumed that, in a state where the first tab screen 50 is displayed such that the standby editing screen 70 (see FIG. 4A) is displayed, the third icon 53, which is the unregistered icon in the common area 41, is changed to the specific function icon associated with the scanning function. In such a case, as shown in FIG. 4C, the third icon 53 in the first tab screen 50 is changed to the specific function icon. Further, the icon located at the same position in the common area 41 in each of the other tab screens, as well as the second tab screen 60, is changed to the specific function icon associated with the same function.

Incidentally, when one of the tab screens is displayed and an operation (e.g., registration, deletion, edition and the like) is applied to an icon arranged in the individual area 42 of the currently displayed tab screen, the operation is reflected only to the icon in the currently displayed tab screen, and will not be applied to the icons included in the other tab screens.

For example, it is assumed that a shortcut icon for a scan-to-file is newly assigned to the eighth icon 58, which is the unregistered icon within the individual area 42, in a state where the standby editing screen 70 shown FIG. 4B is displayed, that is, in a state where the first tab screen 50 is displayed. In such a case, as shown in FIG. 4C, the eighth icon 58 in the first tab screen 50 which is currently displayed is registered as the shortcut icon. However, the icons located at the same position in the individual area 42 of the other tab screens including the tab screen 60 will remain unchanged (see FIG. 4D).

When the operation mode is the administrator mode, each operation of the new registration, deletion, movement, editing and the like can be performed with respect to anyone of the icons arranged within the common area 41 and the individual area 42. In contrast, when the operation mode is a general mode, which is not the administrator mode, the new registration and editing of the icon are allowed in the individual area 42, but not allowed in the common area 41. Further, when the operation mode is the general mode, deletion, movement, swapping of the icons in the common area 41 are not allowed. In other words, the deletion, movement, swapping of the icons in the common area 41 are allowed on the standby editing screen 70 (see FIG. 4A) which can be displayed when the operation mode is the administrator mode. When the operation mode is the general mode, regarding the icons within the individual area 42, deletion of the shortcut icons is allowed but deletion, movement, and swapping of the icons other than the shortcut icons are not allowed. Deletion, movement and swapping of the icons within the individual are 42 are allowed when the operation mode is the administrator mode.

It is noted that, in each of the administrator mode and the general mode, whether the new registration, editing, movement, swapping and the like of the icons are allowed or not in each of the areas 41 and 42 may be determined arbitrarily.

(1-6) Description on Main Control Process

Next, the main control process executed by the controller 11 to realize the above-described various functions will be described referring to FIGS. 5-7B. When the power button 5 is depressed and the electrical power is supplied to the controller 11, the controller executes the main control process shown in FIGS. 5-7B.

Figure 5:
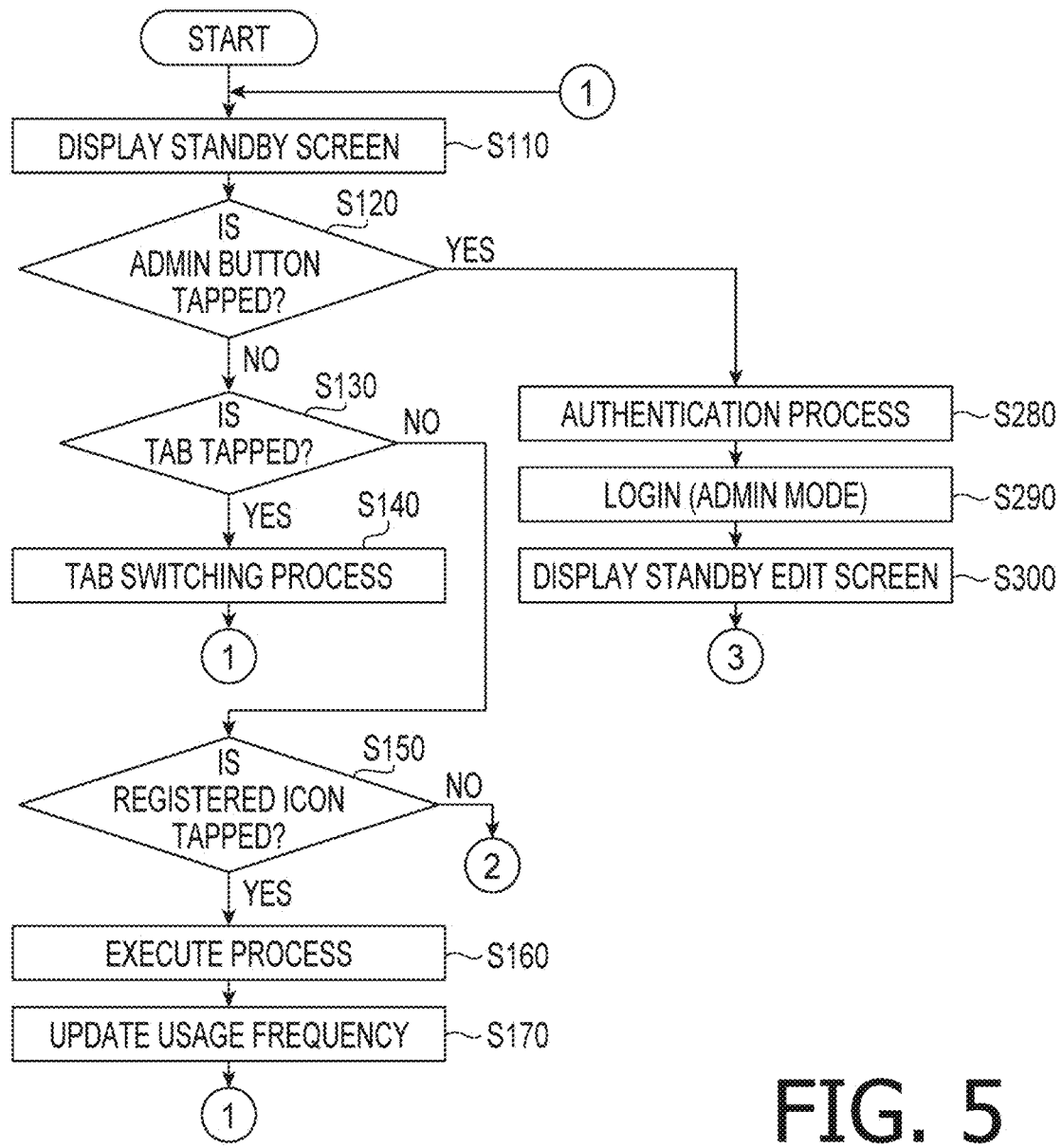
FIGS. 5, 6, 7A and 7B show a flowchart illustrating a main control process according to the illustrative embodiment.
Figure 6:
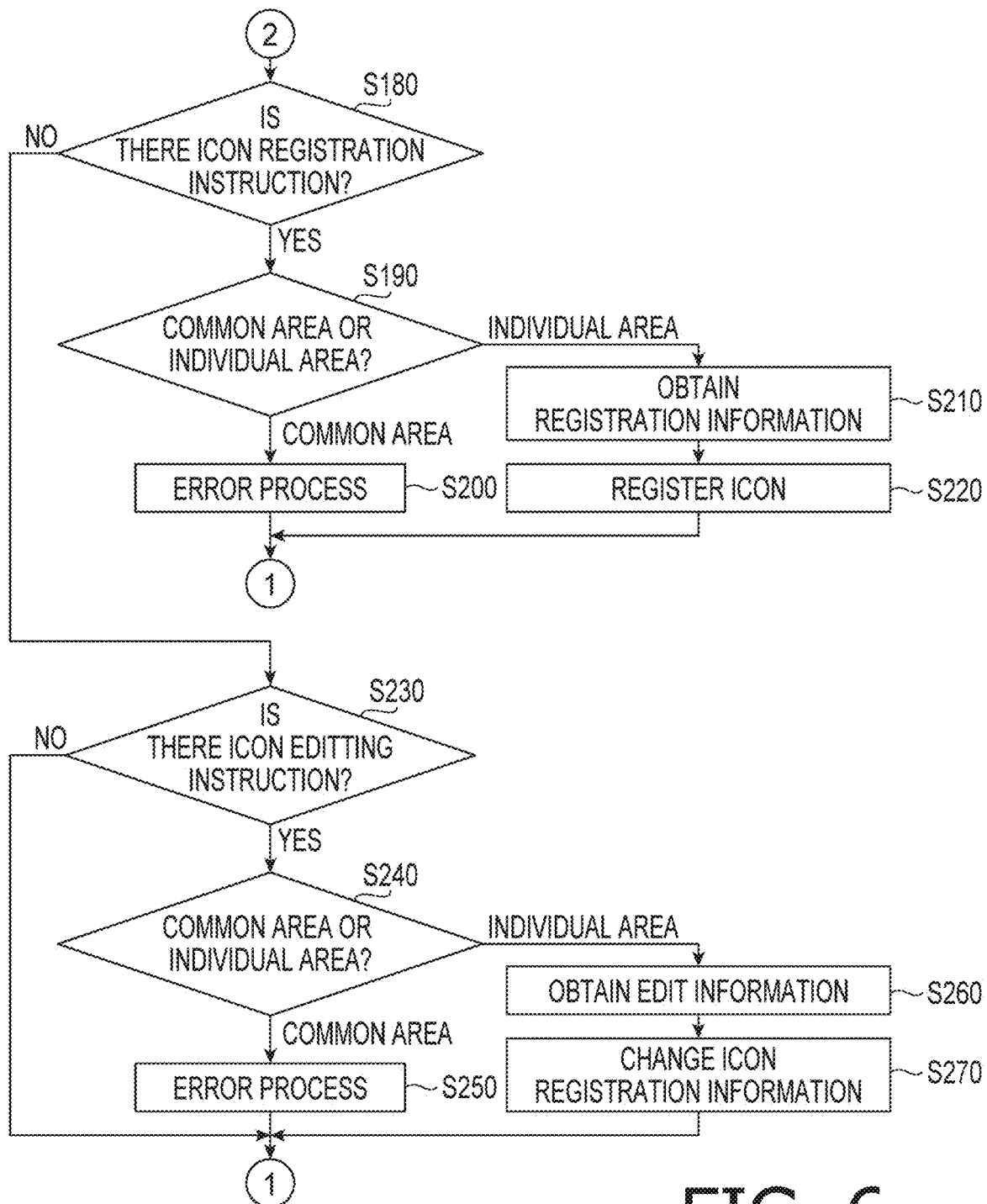

When the controller starts the main control process (FIGS. 5-7B), the controller 11 displays the standby screen 25 on the display 13 in S110 (FIG. 5). It is noted that an initial value of the tab screen, that is, a tab screen to be displayed on the standby screen 25 immediately after the image processing device 10 has been started, a tab screen to be displayed on the standby screen 25 after the function execution has been finished, a tab screen to be displayed on the standby screen 25 when the home button 8 is depressed may be arbitrarily determined. For example, according to the present embodiment, the first tab screen 50 is used.

In S120, the controller 11 determines whether the ADMIN button 28 in the standby screen 25 is tapped. When the controller 11 determines that the ADMIN button 28 has not been tapped (S120: NO), the controller 11 determines whether one of the plurality of tabs displayed on the standby screen 25 has been tapped in S130. When the controller 11 determines that one of the plurality of tabs has been tapped (S130: YES), the controller 11 executes the tab switching process in S140. Specifically, in S140, the controller 11 makes the tapped tab in a selected state, and displays the tab screen assigned to the tapped tab. After the controller 11 switched that tab screen in S140, the controller 11 returns process to S110.

When the controller 11 determines that none of the tabs is tapped (S130: NO), the controller 11 advances process to S150. In S150, the controller 11 determines whether a registered icon (i.e., an icon other than the unregistered icons) has been tapped. When the controller 11 determines that the registered icon has been tapped (S150: YES), the controller 11 proceeds to S160. In S160, the controller 11 executes a particular process assigned to the tapped icon. According to the above configuration, the function or the setting assigned to the icon is realized.

In S170, the controller 11 updates the usage frequency. The usage frequency is information indicating frequency of being tapped and executed in S160 for each of the icons arranged on each tab screen. Concrete contents of the usage frequency may be arbitrarily determined. According to the present embodiment, for example, information indicating date and time at which respective icons are tapped is stored every time when respective icons are tapped, and the number of tapping of each icon from a particular date and time to the present date and time is updated as the usage frequency of each icon upon every tapping thereof. After the controller 11 updates the usage frequency in S170, the controller 11 returns to S110.

When the controller 11 determines that a registered icon has not been tapped (S150: NO), the controller 11 proceeds to S180 (see FIG. 6). In S180, the controller 11 determines whether registration of a new icon is applied to a unregistered icon is instructed. The instruction of registration of the new icon includes, for example, an tapping operation of an unregistered icon. When the controller 11 determines that registration of the new icon is instructed (S180: YES), the controller 11 proceeds to S190.

Figure 8:
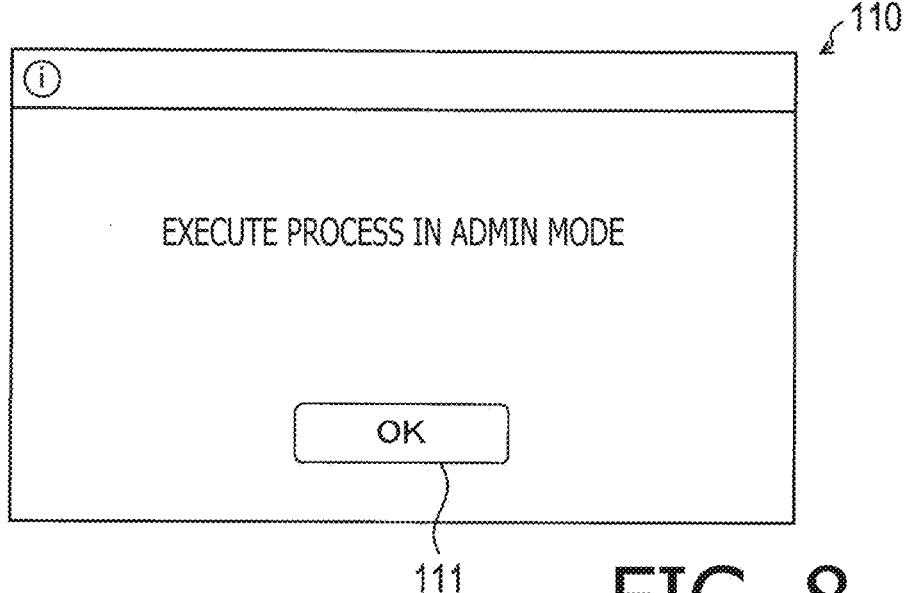
FIG. 8 shows an example of an alert screen according to the illustrative embodiment.

In S190, the controller 11 determines whether the unregistered icon to which the registration instruction has been applied is arranged in the common area 41 or the individual area 42. When the registration instruction is applied to the unregistered icon arranged within the common area 41 (S190: COMMON AREA), the controller 11 proceeds to S200, executes an error process and returns to S110. The error process in S200 is a process of notifying the user that the new registration of the icon in the common area 41 cannot be performed in the current mode (i.e., the general mode), and for example, an alert screen 110 as shown in FIG. 8 may be displayed on the display 13. In such a case, when an OK button 111 displayed on the alert screen 110 is tapped, the controller 11 may return process to S110.

When the registration instruction is applied to the unregistered icon arranged in the individual area 42 (S190: INDIVIDUAL AREA), the controller 11 proceeds to S210. In S210, the controller 11 obtains registration information through the user input operation. The registration information is information indicating concrete contents such as s function and/or setting items subject to the new registration. In S220, the controller 11 newly registers an icon based on the registration information obtained in S210. Then, the unregistered icon to which the registration instruction is applied is switched to the icon assigned with the particular process based on the registration information obtained in S210. After newly registering the icon in S220, the controller 11 returns to S110.

When the controller 11 determines that the registration of the new icon has not been instructed (S180: NO), the controller 11 proceeds to S230. In S230, the controller 11 determines whether editing instruction has been applied to a registered icon. The editing instruction includes, for example, a long press of the target icon. The long press is an operation to be executed after an instruction operation is executed to cancel the instruction operation by depressing an operation target for a particular period or more through the touch panel 14a.

When the controller 11 determines that the editing instruction has not been applied to a registered icon (S230: NO), the controller 11 returns to S110. When the controller 11 determines that the editing instruction has been applied to a registered icon (S230: YES), the controller 11 proceeds to S240.

In S240, the controller 11 determines whether the icon to which the editing instruction is applied is arranged in the common area 41 or the individual area 42. When the controller 11 determines that the editing instruction is applied to the icon arranged in the common area 41, the controller 11 executes an error process (S250), and returns to S110. The error process in S250 is a process of notifying the user that editing of the icons arranged in the common area 41 cannot be executed in the current operation mode (i.e., the general mode), and for example, the controller 11 may display a particular alert message on the display 13.

When the controller 11 determines that the editing instruction has been applied to the icon arranged in the individual are 42 (S240: INDIVIDUAL AREA), the controller 11 proceeds to S260. In S260, the controller 11 obtains editing information in accordance with an input operation by the user. The editing information is information indicating changes in registration information associated with the target icon. In S270, the controller 11 changes the registration information associated with the icon based on the editing information obtained in S260. After changing the registration information of the icon in S270, the controller 11 returns to S110.

When the controller 11 determines that the ADMIN button 28 is tapped (FIG. 5, S120: YES), the controller 11 executes the authentication process in S280. When the authentication is successfully completed as authentication condition (e.g., matching of a password), the controller 11 executes a login process in S290. That is, in S290, the operation mode is switched to the ADMIN mode. Then, in S300, the controller 11 displays the standby editing screen 70 on the display 13. After displaying the standby editing screen in S300, the controller 11 proceeds to S310 (see FIG. 7A).

In S310, the controller 11 determines whether a registration instruction of a new icon has been applied to an unregistered icon. When the controller 11 determines that the registration instruction of the new icon has not been applied to the unregistered icon (S310: NO), the controller 11 proceeds to S360. When the controller 11 determines that the registration instruction of the new icon has been applied to the unregistered icon (S310: YES), the controller 11 proceeds to S320. In S320, the controller 11 obtains registration information in accordance with the input operation by the user.

In S330, the controller 11 determines whether the unregistered icon to which the registration instruction has been applied is arranged in the common area 41 or the individual area 42. When the registration instruction has been applied to the unregistered icon arranged in the common area 41 (S330: COMMON AREA), the controller 11 proceeds to S340. In S340, in addition to the unregistered icon to which the registration instruction has been directly applied in the currently displayed tab screen, for the unregistered icons arranged at the same position in all tab screens, the controller 11 newly registers the icons based on the registration information obtained in S320. As a result, in all the tab screens, the same icons are newly registered and arranged at the same position. After execution of S340, the controller 11 proceeds to S360.

When the controller 11 determines that the registration instruction has been applied to the unregistered icon in the individual area 42 (S330: INDIVIDUAL AREA), the controller 11 proceeds to S350. In S350, the controller 11 applies the registration instruction only to the unregistered icon to which the registration instruction is directly applied in the currently displayed tab screen in accordance with the registration information obtained in S320. After execution of S350, the controller 11 proceeds to S360.

Figure 7A:
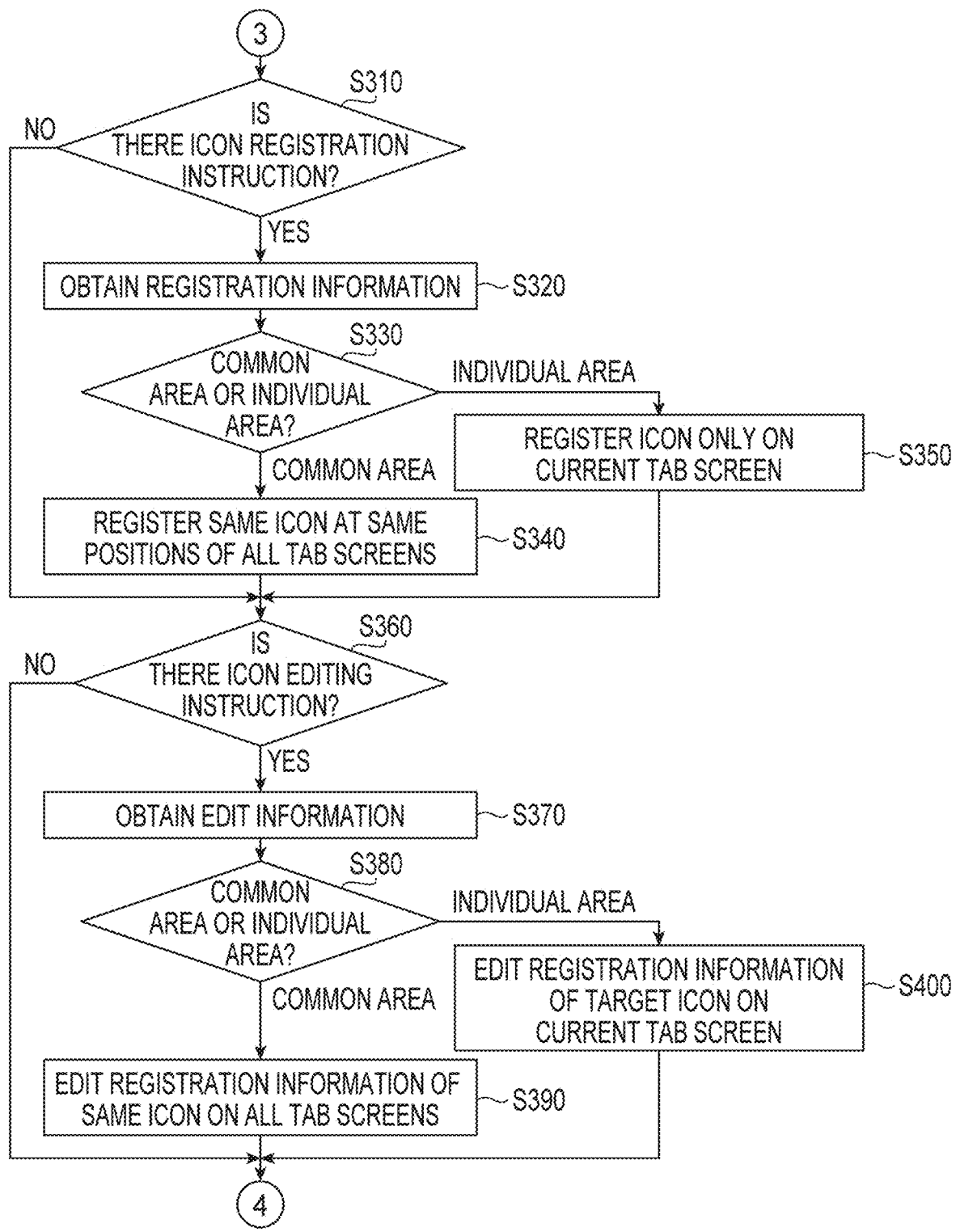
Figure 7B:
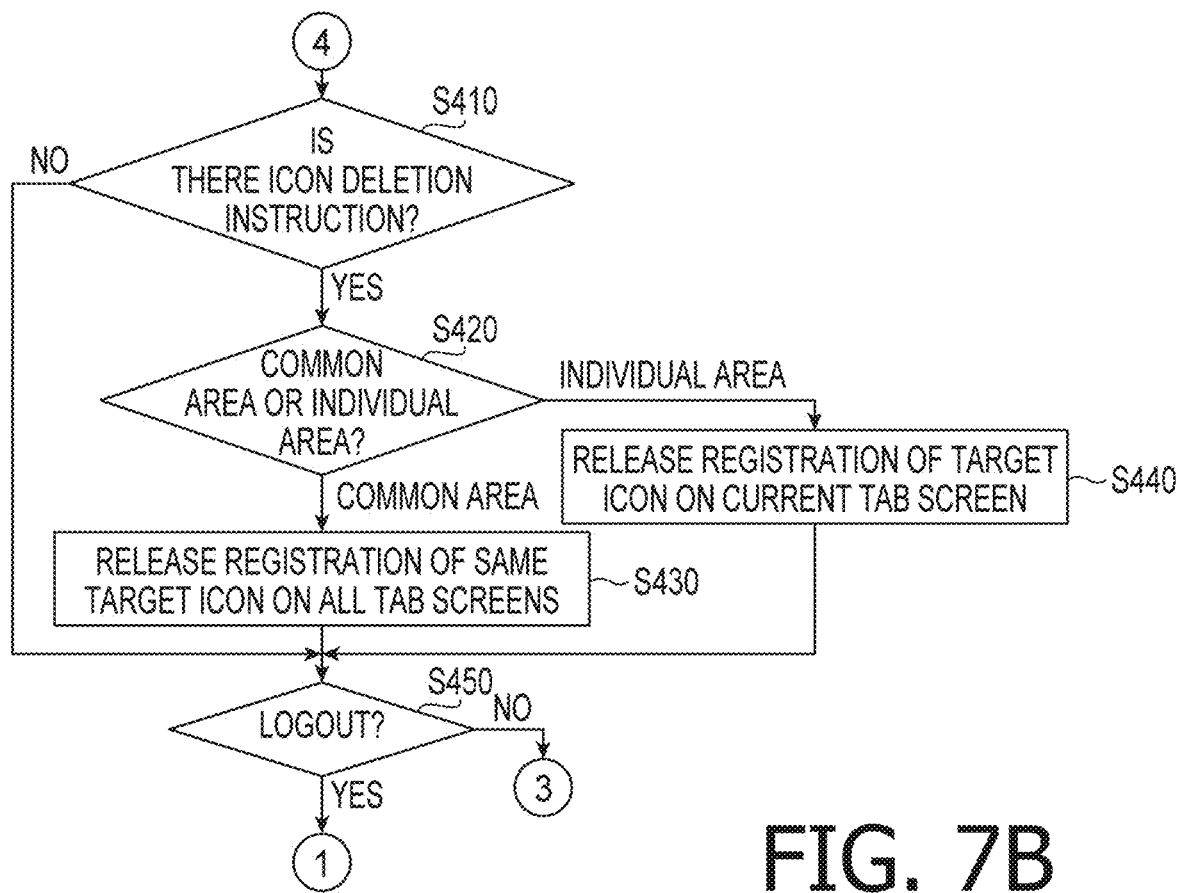

In S360, the controller 11 determines whether the editing instruction has been applied to the registered icon. When the controller 11 determines that the editing instruction has not been applied to the registered icon (S360: NO), the controller 11 proceeds to S410 (FIG. 7B). When the controller 11 determines that the editing instruction has been applied to the registered icon (S360: YES), the controller 11 proceeds to S370. In S370, the controller 11 obtains the editing information in accordance with the input operation by the user.

In S380, the controller 11 determines whether the icon to which the editing instruction is applied is arranged in the common area 41 or the individual area 42. When the controller 11 determines that the editing instruction has been applied to the icon arranged in the common area 41, the controller 11 proceeds to S390. In S390, in addition to the icon to which the editing instruction has been directly applied in the currently displayed tab screen, for the icons arranged at the same position in all the tab screens, the controller 11 registers the registration information based on the editing information obtained in S370. As a result, in all the tab screens, the registration information is registered for the same icons arranged at the same position. After execution of S390, the controller 11 proceeds to S410 (FIG. 7B).

When the controller 11 determines that the editing instruction has been applied to the icon arranged in the individual area 42 (S380: INDIVIDUAL AREA), the controller 11 proceeds to S400. In S400, only for the icon to which the editing instruction has been directly applied in the currently displayed tab screen, the controller 11 registers the registration information based on the editing information obtained in S370. After execution of the editing process in S400, the controller 11 proceeds to S410.

In S410, the controller 11 determines whether deletion instruction has been applied to the registered icon. The deletion instruction in S410 is an operation of tapping the deletion button 84 after tapping a registered icon to select the same as a deletion target.

When the controller 11 determines that the deletion instruction has not been applied to the registered icon (S410: NO), the controller 11 proceeds to S450. When the controller 11 determines that the deletion instruction has been applied to the registered icon (S410: YES), the controller 11 proceeds to S420. In S420, the controller 11 determines whether the icon to which the deletion instruction is applied is arranged in the common area 41 or the individual area 42.

When the controller 11 determines that the icon to which the deletion instruction has been applied is arranged in the common area 41, the controller 11 proceeds to S430. In S430, the controller 11 deletes, in addition to the icon to which the deletion instruction has been directly applied in the currently displayed tab screen, all the icons located at the same position in all the tab screens. As a result, registration of all the icons located at the same position on all the tab screens are simultaneously released, the icons are displayed as the unregistered icons. After execution of S430, the controller 11 proceeds to S450.

When the controller 11 determines that the icon to which the deletion instruction is applied is arranged in the individual area 42 (S420: INDIVIDUAL), the controller 11 proceeds to S440. In S440, the controller 11 deletes only the icon to which the deletion instruction is directly applied on the currently displayed tab screen. As a result, the registration of the deletion target icon is released and displayed as the unregistered icon. After execution of S440, the controller 11 proceeds to S450.

In S450, the controller 11 determines whether a particular logout operation by the user is executed. The logout operation is an operation to change the operation mode from the ADMIN mode to the general mode. When the controller 11 determines that the logout operation has not been executed (S450: NO), the controller 11 returns to S310 (FIG. 7A). When the controller 11 determines that the logout operation has been executed (S450: YES), the controller 11 returns to S110 (FIG. 5).

(1-7) Description on Arranged Area Changing Process

Hereinafter, an arranged area changing process executed by the controller 11 will be described, referring to FIGS. 9A and 9B. When the power button 5 is depressed and the electrical power is supplied to the image processing device 10, the controller 11 repeatedly executes an arranged area changing process shown in FIGS. 9A and 9B periodically.

Figure 9A:
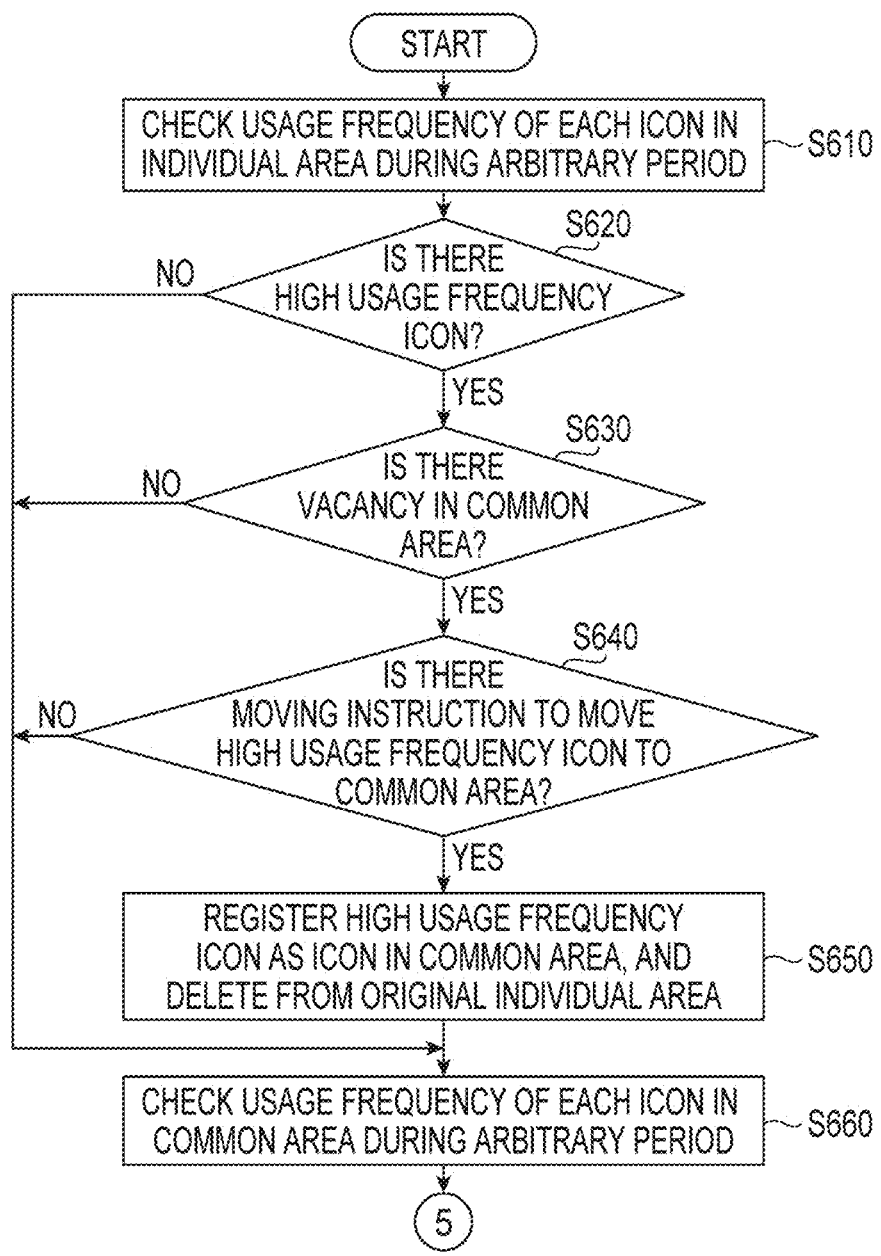
FIGS. 9A and 9B show a flowchart illustrating an arranged area changing process according to the illustrative embodiment.
Figure 9B:
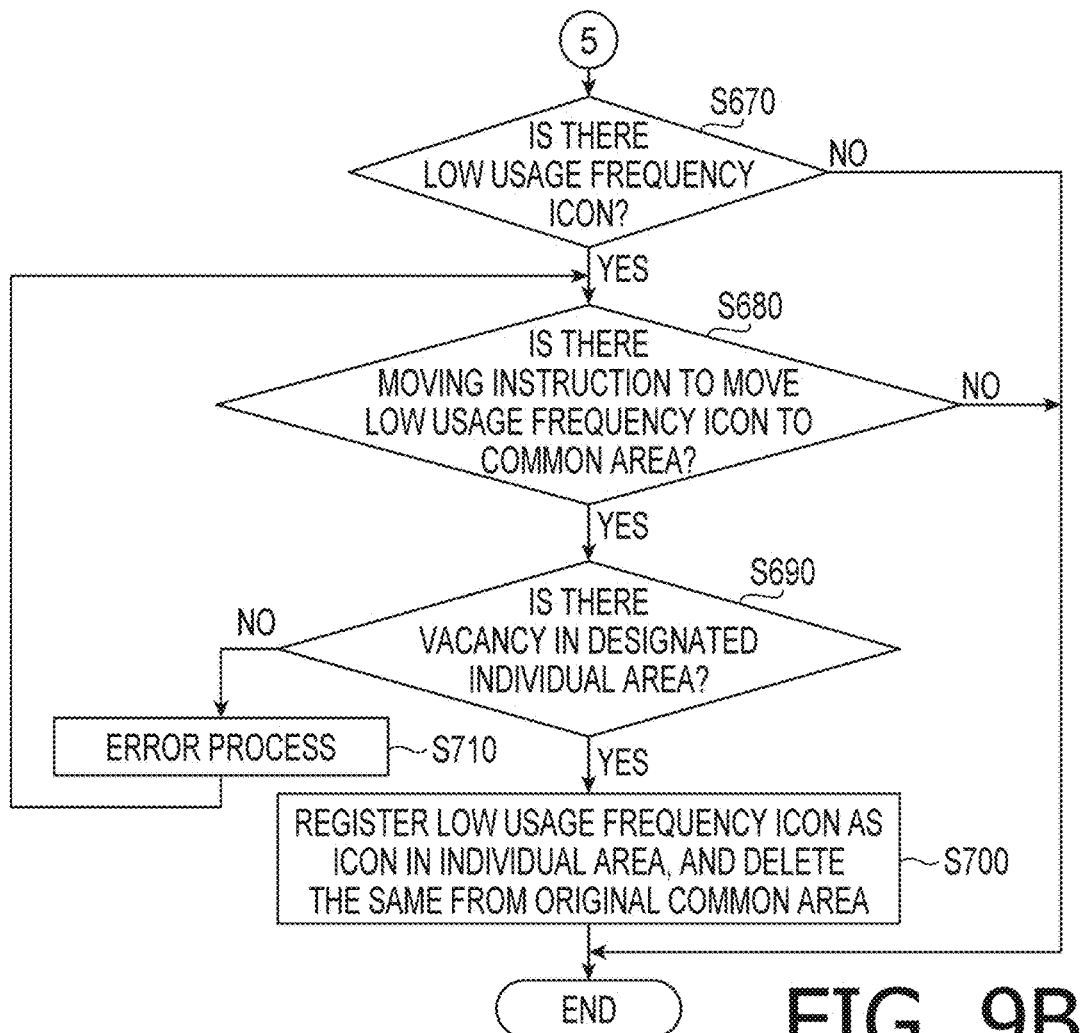

When the arranged area changing process shown in FIGS. 9A and 9B is started, the controller 11 check usage frequency of each of the icons arranged in the individual area 42 of each tab screen. As mentioned before, the usage frequency is information updated in S170 (FIG. 5).

In S620, the controller 11 determines whether there exists a high usage frequency icon among the icons arranged in the individual area 42 of each tab screen. The high usage frequency means that usage frequency is relatively high. Concretely, according to the present embodiment, when the usage frequency of an icon is equal to or larger than a particular high frequency reference value, the icon is referred to as the high usage frequency icon. When the controller 11 determines that there is no high usage frequency icon in the individual area 42 (S620: NO), the controller 11 proceeds to S660. When the controller 11 determines that there exists the high usage frequency icon in the individual area 42 (S620: YES), the controller 11 proceeds to S630.

In S630, the controller 11 determines whether there is a vacancy for an icon in the common area 41 in the tab screen provided with the high usage frequency icon arranged on the individual area 42. It is noted that existence of the vacancy means there is an unregistered icon. When the controller 11 determines that there is no vacancy in the common area 41 (S630: NO), the controller 11 proceeds to S660. When the controller 11 determines that there exists a vacancy in the common area 41 (S630: YES), the controller 11 proceeds to S640.

Figure 10:
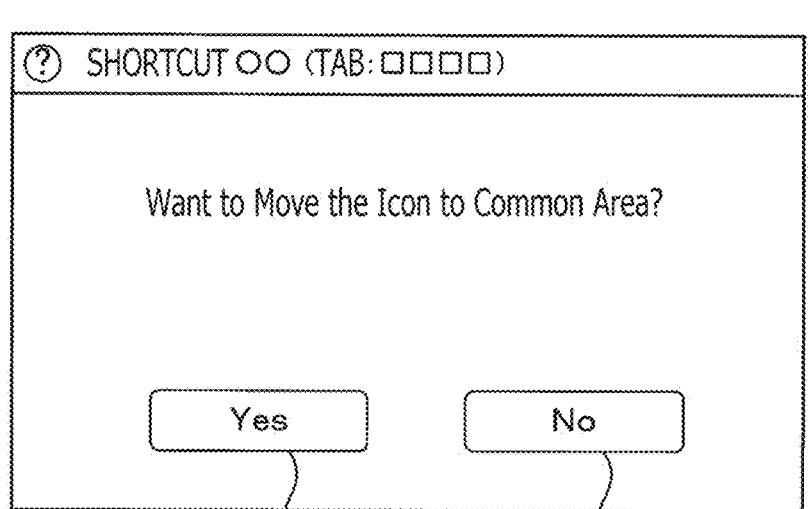
FIG. 10 shows an example of a selection input screen according to the illustrative embodiment.

In S640, the controller 11 determines whether a movement instruction to move the high usage frequent icon to the common area 41 is input by the user. Concretely, according to the present embodiment, the controller 11 displays a selection input screen 120 (FIG. 10) on the display 13 in S640. On the selection input screen 120, a name of the high usage frequency icon, a tab name corresponding to the tab screen on which the high usage frequency icon is arranged, and a message asking the user whether the user wishes to move the icon to the common area 41. Further, on the selection input screen 120, a YES button 121 and a NO button 122 are also displayed.

When the movement instruction has not been input (S640: NO), that is, when the NO button 122 is tapped in the selection input screen 120, the controller 11 proceeds to S660. When the controller 11 determines that the movement instruction is applied (S640: YES), that is, when the YES button 121 is tapped in the selection input screen 120, the controller 11 proceeds to S650.

In S650, the controller 11 moves the high usage frequency icon to the common area 41. That is, the controller 11 switches the unregistered icon arranged in the common area 41 to the high usage frequency icon which was located in the individual area 42. Further, the controller deletes the high usage frequency icon subject to the movement from the individual area 42. As a result, the high usage frequency icon previously arranged in the individual area 42 of a certain tab screen is now displayed in the common area 41 of all the tab screens.

In S660, the controller 11 checks the usage frequency for each of the icons arranged in the common area 41. In S670, the controller 11 determines whether there exists a low usage frequency icon among the icons arranged in the common area 41. The low usage frequency icon is an icon of which usage frequency is relatively low. Concretely, according to the present embodiment, the low usage frequency icon is an icon of which usage frequency is less than a particular low usage frequency reference value. When the controller 11 determines that there is no low usage frequency icon in the common area 41 (S670: NO), the controller 11 terminates the arranged area changing process. When the controller 11 determines that there exists a low usage frequency icon in the common area 41 (S670: YES), the controller 11 proceeds to S680.

In S680, the controller 11 determines whether the moving instruction to move the low usage frequency icon to the individual area 42 of anyone of the tab screen has been input by the user. When the controller 11 determines that such a moving instruction has not been input (S680: NO), the controller 11 terminates the arranged area changing process. When the controller 11 determines that the moving instruction described above has been input (S680: YES), the controller 11 proceeds to S690.

In S690, the controller 11 determines whether there is a vacancy in the individual area 42 of the tab screen designated by the user as an arranging destination of the low usage frequency icon. When the controller 11 determines that there is not a vacancy in the destination individual area 42 (S690: NO), the controller 11 executes a particular error process and returns to S680. When the controller 11 determines that there is a vacancy in the destination individual area 42 (S690: YES), the controller 11 proceeds to S700. In S700, the controller 11 moves the low usage frequency icon to the individual area 42 of the tab screen designated by the user. In other words, the controller 11 changes the unregistered icon in the individual area 42 of the tab screen designated by the user to the low usage frequency icon, which was the moving source icon. Further, the controller 11 deletes the low usage frequency icon which was originally arranged in the common area 41 therefrom. As a result, the low usage frequency icon having been displayed in the common area 41 of all the tab screen will be displayed only in the individual area 42 of a one particular tab screen.

(1-8) Effects of Embodiment

According to the illustrative embodiment described above, the following effects (a)-(d) can be obtained.

(a) In the multi-tab format standby screen 25, each of the tab screens 50 and 60 corresponding to the respective tabs includes the common area 41 and the individual area 42. When an icon is newly registered in the individual area 42 of the currently displayed tab screen, the icon is registered and displayed in the individual area 42 of only the currently displayed tab screen. Incidentally, when an icon is newly registered in the common area 41 of the currently displayed tab screen, the same icon is registered and displayed in the common areas 41 of all the tab screens including the currently displayed tab screen.

Accordingly, simply by newly registering an icon in the common area 41 of the currently displayed tab screen, the same icon can be arranged in all the common areas of a plurality of tab screens. Therefore, the user can select an icon to which a desired process is assigned from among a plurality of tab screens efficiently, and executes the particular process efficiently.

(b) Deletion of a registered icon arranged in the common area 41 or edition of registered information assigned to the registered icon arranged in the common area 41 is performed, the deletion or the edition is reflected to the same icon arranged in all the registered icon in the common areas 41 of all the tab screens.

Therefore, the user can delete or edit a desired one of the icons arranged in the common areas 41 of all the tab screens simultaneously.

(c) New registration of an icon in the tab screen can be performed by tapping an unregistered icon. That is, when the unregistered icon is arranged in the common area 41 of the tab screen displayed on the display 13, the user can change the unregistered icon to the registered icon by assigning a desired function or setting item(s) to the unregistered icon. Further, the registration contents are reflected to all the unregistered icons arranged at the same position in the common areas 41 of all the tab screens.

Further, in a state where one of the tab screens is being displayed, if the user deletes a desired registration icon arranged in the common area 41, all the registered icons arranged at the same position of the common areas 41 in all the tab screens are changed to the unregistered icons. Therefore, the user can assign another function to the unregistered icon. That is, new registration and deletion of the icon(s) in the common area 41 can be performed easily and efficiently.

(d) When there is a low usage frequency icon among the registered icons arranged in the common area 41, the user can move such an icon to the individual area 42 of one of the tab screen easily.

Further, when there is a high usage frequency icon among the registered icons arranged in the individual area 42, the user can move such an icon to the common area 41 easily. Therefore, the user can move each icon to an appropriate one of the common area 41 and the individual area 42 in accordance with the usage frequency thereof easily and efficiently.

It is noted that the unregistered icon in the embodiment is an example of an unused icon. Further, the registered icon to which a function or a setting item is assigned is an example of a particular icon. The number of the icons (i.e., "4") arranged in the common area 41 is an example of a particular number. The ADMIN mode is an example of a particular user mode. Registered/unregistered state of a function or a setting item and the registered content with respect to an icon is example of a corresponding state.

S110 is an example of a displaying process. S180, S210, S310 and S320 corresponding to an example of an arranging and receiving process. S220, S340 and S350 are examples of arranging process. S2630, S260, S360, S370 and S410 constitute an example of a change accepting process. S270, S390, S400 and S430 constitute an example of changing process. S170 is an example of a frequency calculating process. S650 is an example of a communalizing process. S700 is an example of a common arrangement releasing process and an individualizing process.

2. Other Embodiments

It is noted that the aspects of the present disclosures need not be limited to the above-described configuration, but can be modified in various ways.

(2-1) According to the above-described embodiment, the number of the icons arranged in the common area 41 is four. It is noted that the number of the icons arranged in the common area 41 can be the number other than four. Similarly, the number of the icons arranged in the individual area 42 can be the number other than four.

(2-2) In the entire area of the tab screen, positions and sizes of the common area 41 and the individual area 42 may be determined arbitrarily. In the above-described embodiment, an upper half of the tab screen is defined as the common area 41, and a lower half of the tab screen is defined as the individual area 42. Such a configuration is only an example, and the common area 41 and the individual area 42 may be arranged oppositely. Alternatively, the common area 41 and the individual area 42 may be arranged in a right-left direction but not an up-down direction.

Further, how the icons are arranged in each of the common area 41 and the individual area 42, and how each icon is shaped may be arbitrarily determined.

(2-3) It is noted that all the tab screens respectively corresponding to all of Nt tabs do not necessarily have both the common area 41 and the individual area 42. That is, there may be tab screens which do not have the common areas 41 among the Nt tab screens, and there may be tab screens which do not have the individual screens 42 among the Nt tab screens.

(2-4) Even in the general mode, moving the icons, swapping the icons and/or deleting the icons in each of the common area 41 and the individual area 42 may; be enabled. Further, movement of an icon between the common area 41 and the individual area 42 and/or exchanging the icons between the common area 41 and the individual area 42 may be enabled. In the above-described embodiment, in the individual area 42, registration of a new icon, edition of the icon are allowed even in the general mode. However, such a configuration may be modified such that registration of a new icon, edition of the icons in the individual area 42 may be prohibited even in the general mode. Alternatively, registration of a new icon, edition of the icons both in common area 41 and the individual area 42 may be allowed even in the general mode.

(2-5) A method of making the common area 41 and the individual area 42 visually distinguishable can be determined arbitrarily. For example, ground colors and/or ground patterns of the areas 41 and 42 may be differentiated. Optionally or alternatively, the colors, patterns and/or shapes of the icons arranged in the areas 41 and 42 may be differentiated. Further optional or alternatively, boundary lines may be displayed at boundary between the areas 41 and 42.

(2-6) A plurality of functions one component of the above-described embodiment has may be realized by a plurality of components, or one function a single component of the above-described embodiment has may be realized by a plurality of components. Further, a plurality of functions which a plurality of components have may be realized by a single component, or a single function realized by a plurality of components may be realized by a single component. Further, a part of configuration of the above-described embodiment may be omitted. Further, at least a part of the configuration of the above-described embodiment may be added to another (alternative) configuration of the above-described embodiment, or replaced with other components.

What is claimed is:

1. A display control device, comprising:
    a display;
    an input device; and
    a controller,
    wherein the controller is configured to cause the display control device to display a standby screen including a plurality of tabs, and a tab screen corresponding to one of the plurality of tabs in a selected state from among a plurality of tab screens respectively corresponding to the plurality of tabs,
    wherein each of the plurality of tab screens has a common area and an individual area, icons being displayed in each of the common area and the individual area,
    wherein the common area and the individual area are configured such that one or more icons assigned with a particular process are arranged in each of the common area and the individual area,
    wherein the display control device is operable either in an administrator mode and a general mode, an authentication being required when the display control device is to operate in the administrator mode while no authentication being required when the display control device is to operate in the general mode,
    wherein the controller is further configured to:
        execute authentication of a particular user;
        set an operation mode of the display control device to the administrator mode when the authentication is successful;
        set the operation mode of the display control device to the general mode when the operation mode of the display control device is not set to the administrator mode;
        receive, through the input device, a registration instruction to register a particular icon on an area to be displayed on the display;
        determine whether the operation mode of the display control device is the administrator mode or the general mode;
        determine whether the area on which the registration instruction instructs to register the particular icon is the common area or the individual area;
        when determining that the area is the common area, register the particular icon on the common area of each of the plurality of tab screens if the operation mode is the administrator mode and not register the particular icon if the operation mode is the general mode;
        when determining that the area is the individual area, register the particular icon on the individual area of only the tab screen currently displayed on the display regardless whether the operation mode is the administrator mode or the general mode; and
        display the standby screen after registration of the particular icon on one of the common area of each of the plurality of tab screens and the individual area of the tab screen currently displayed.

2. The display control device according to claim 1,
    wherein the controller is further configured to:
        receive, through the input device, a particular changing operation to change a corresponding state of the particular process to the particular icon in the tab screen currently displayed; and
        change the corresponding state of the particular icon corresponding to the received changing operation in accordance with the received changing operation, the controller applying same change to the particular icon arranged in the common area of each of the plurality of tab screens when the particular icon corresponding to the changing operation is arranged in the common area and the operation mode of the display control device is the administrator mode.

3. The display control device according to claim 2,
    wherein the common area is defined such that a particular number of icons are arranged in the common area,
    wherein, when the number of the particular icons arranged in the common area is less than the particular number, unused icons are arranged in the common area as icons other than the particular icons, the unused icons not being assigned with the particular process,
    wherein the controller is configured to:
        receive an arranging operation in the common area as an operation with respect to the unused icon arranged in the common area;
        when the operation mode is the administrator mode, newly arrange the particular icon in the common area by changing the unused icon subject to the arranging operation to the particular icon;
        receive a deleting operation to delete the particular icon arranged in the common area from the common area; and
        when the operation mode is the administrator mode, delete the particular icon from the common area by changing the particular icon corresponding to the deleting operation to the unused icon.

4. The display control device according to claim 1,
wherein the common area is defined such that a particular number of icons are arranged in the common area,
wherein, when the number of the particular icons arranged in the common area is less than the particular number, unused icons are arranged in the common area as icons other than the particular icons, the unused icons not being assigned with the particular process,
wherein the controller is configured to receive an arranging operation in the common area as an operation with respect to the unused icon arranged in the common area, and
wherein, when the operation mode is the administrator mode, the controller is configured to newly arrange the particular icon in the common area by changing the unused icon corresponding to the arranging operation to the particular icon.

5. A display control device, comprising:
a display;
an input device; and
a controller,
wherein the controller is configured to cause the display control device to display a standby screen including a plurality of tabs, and a tab screen corresponding to one of the plurality of tabs in a selected state from among a plurality of tab screens respectively corresponding to the plurality of tabs,
wherein each of the plurality of tab screens has a common area and an individual area, icons being displayed in each of the common area and the individual area,
wherein the common area and the individual area are configured such that one or more icons assigned with a particular process are arranged in each of the common area and the individual area,
wherein the controller is further configured to:
 receive, through the input device, a registration instruction to register a particular icon on an area to be displayed on the display;
 determine whether the area on which the registration instruction instructs to register the particular icon is the common area or the individual area;
 when determining that the area is the common area, register the particular icon on the common area of each of the plurality of tab screens;
 when determining that the area is the individual area, register the particular icon on the individual area of only the tab screen currently displayed on the display; and
 display the standby screen after registration of the particular icon on one of the common area of each of the plurality of tab screens and the individual area of the tab screen currently displayed,
wherein the controller is further configured to:
 define each of the particular icons arranged in the individual area as individual particular icons;
 calculate execution frequency representing frequency of execution of the particular process assigned to the individual particular icon for each of the individual particular icons in each of the plurality of tab screens;
 wherein, when there is an individual particular icon of which frequency as calculated is equal to or larger than a particular high frequency reference value, delete the individual particular icon from the individual area and arrange the individual particular icon in the common area of each of the plurality of tab screens.

6. A display control device, comprising:
a display;
an input device; and
a controller,
wherein the controller is configured to cause the display control device to display a standby screen including a plurality of tabs, and a tab screen corresponding to one of the plurality of tabs in a selected state from among a plurality of tab screens respectively corresponding to the plurality of tabs,
wherein each of the plurality of tab screens has a common area and an individual area, icons being displayed in each of the common area and the individual area,
wherein the common area and the individual area are configured such that one or more icons assigned with a particular process are arranged in each of the common area and the individual area,
wherein the controller is further configured to:
 receive, through the input device, a registration instruction to register a particular icon on an area to be displayed on the display;
 determine whether the area on which the registration instruction instructs to register the particular icon is the common area or the individual area;
 when determining that the area is the common area, register the particular icon on the common area of each of the plurality of tab screens;
 when determining that the area is the individual area, register the particular icon on the individual area of only the tab screen currently displayed on the display; and
 display the standby screen after registration of the particular icon on one of the common area of each of the plurality of tab screens and the individual area of the tab screen currently displayed,
wherein the controller is further configured to:
 define each of the particular icons arranged in the common area as common particular icons;
 calculate execution frequency representing frequency of execution of the particular process assigned to the common particular icon for each of the common particular icons in each of the plurality of tab screens;
 wherein, when there is an individual particular icon of which frequency as calculated is less than a particular low frequency reference value, delete the common particular icon from the common area of each of the plurality of tab screens.

7. The display control device according to claim 6,
wherein, when there is an individual particular icon of which frequency as calculated is less than the particular low frequency reference value, the controller is configured to arrange the common particular icon in the individual area of anyone of the plurality of tab screens.

8. A display control method for a display control device having a display and an input device, the method comprises:
 causing the display control device to display a standby screen including a plurality of tabs, and a tab screen corresponding to one of the plurality of tabs in a selected state from among a plurality of tab screens respectively corresponding to the plurality of tabs,
wherein each of the plurality of tab screens has a common area and an individual area, icons being displayed in each of the common area and the individual area,
wherein the common area and the individual area are configured such that one or more icons assigned with a particular process are arranged in each of the common area and the individual area, wherein the display control device is operable either in an administrator mode and a general mode, an authentication being required when the display control device is to operate in the administrator mode while no authentication being required when the display control device is to operate in the general mode, wherein the method further comprises:
   executing an authentication of a particular user;
   setting an operation mode of the display control device to the administrator mode when the authentication is successful;
   setting the operation mode of the display control device to the general mode when the operation mode of the display control device is not set to the administrator mode;
   receiving, through the input device, a registration instruction to register a particular icon on an area to be displayed on the display,
   determine whether the operation mode of the display control device is the administrator mode or the general mode;
   determining whether the area on which the registration instruction instructs to register the particular icon is the common area or the individual area;
   when determining that the area is the common area, register the particular icon on the common area of each of the plurality of tab screens if the operation mode is the administrator mode and not register the particular icon if the operation mode is the general mode;
   when determining that the area is the individual area, register the particular icon on the individual area of only the tab screen currently displayed on the display regardless whether the operation mode is the administrator mode or the general mode; and
   displaying the standby screen after registration of the particular icon on one of the common area of each of the plurality of tab screens and the individual area of the tab screen currently displayed.

9. A non-transitory computer-readable medium containing instructions to be executed by a controller of a display control device having a display, an input device and the controller,
   the instructions causing, when executed by the controller, the display control device to display a standby screen including a plurality of tabs, and a tab screen corresponding to one of the plurality of tabs in a selected state from among a plurality of tab screens respectively corresponding to the plurality of tabs, each of the plurality of tab screens having a common area and an individual area, icons being displayed in each of the common area and the individual area, the common area and the individual area being configured such that a particular icon assigned with a particular process being arranged in each of the common area and the individual area,
   the display control device is operable either in an administrator mode and a general mode, an authentication being required when the display control device is to operate in the administrator mode while no authentication being required when the display control device is to operate in the general mode,
   the instructions further causing, when executed by the controller, the display control device to:
      execute authentication of a particular user;
      set an operation mode of the display control device to the administrator mode when the authentication is successful;
      set the operation mode of the display control device to the general mode when the operation mode of the display control device is not set to the administrator mode;
      receive, through the input device, a registration instruction to register a particular icon on an area to be displayed on the display;
      determine whether the operation mode of the display control device is the administrator mode or the general mode;
      determine whether the area on which the registration instruction instructs to register the particular icon is the common area or the individual area;
      when determining that the area is the common area, register the particular icon on the common area of each of the plurality of tab screens if the operation mode is the administrator mode and not register the particular icon if the operation mode is the general mode;
      when determining that the area is the individual area, register the particular icon on the individual area of only the tab screen currently displayed on the display regardless whether the operation mode is the administrator mode or the general mode; and
      display the standby screen after registration of the particular icon on one of the common area of each of the plurality of tab screens and the individual area of the tab screen currently displayed.

* * * * *